United States Patent [19]

Spangenberg et al.

[11] Patent Number: 6,140,824
[45] Date of Patent: Oct. 31, 2000

[54] CIRCUIT ARRANGEMENT FOR THE METROLOGICAL DETERMINATION OF DIAMETERS OF METAL BODIES

[75] Inventors: Robert Spangenberg, Schwabmuenchen; Fritz Pauker, Friedberg; Alfred Gahn, Koenigsbrunn, all of Germany

[73] Assignee: Patent-Treuhand-Gesellschaft fuer Elektrishe Gluehlampen, Munich, Germany

[21] Appl. No.: 09/101,638
[22] PCT Filed: Jan. 16, 1997
[86] PCT No.: PCT/DE97/00073
 § 371 Date: Jul. 14, 1998
 § 102(e) Date: Jul. 14, 1998
[87] PCT Pub. No.: WO97/26504
 PCT Pub. Date: Jul. 24, 1997

[30] Foreign Application Priority Data

Jan. 17, 1996 [DE] Germany .............. 296 00 775 U
Feb. 20, 1996 [DE] Germany .............. 196 06 154

[51] Int. Cl.[7] ................................................. G01R 27/26
[52] U.S. Cl. ................................... 324/671; 324/684
[58] Field of Search ........................ 324/661, 662, 324/663, 669, 670, 671, 672, 673, 679, 680, 684, 685, 686, 690, 72

[56] References Cited

U.S. PATENT DOCUMENTS

| | | | |
|---|---|---|---|
| 2,274,735 | 3/1942 | Peters et al. | 324/662 |
| 3,185,924 | 5/1965 | Locher | 324/669 |
| 3,535,631 | 10/1970 | Geest et al. | 324/662 |
| 4,141,149 | 2/1979 | George et al. | |
| 4,706,014 | 11/1987 | Fabbri et al. | 324/662 |
| 4,780,662 | 10/1988 | Bennett et al. | 324/662 |
| 5,168,239 | 12/1992 | Winship | 324/671 |
| 5,936,394 | 3/1999 | Kaneko et al. | 324/72 |

FOREIGN PATENT DOCUMENTS 56-169909 12/1981 Japan .
63-233381 9/1988 Japan .

Primary Examiner—Safet Metjahic
Assistant Examiner—Vincent Q. Nguyen
Attorney, Agent, or Firm—Robert F. Clark

[57] ABSTRACT

A circuit arrangement for measuring the diameters of metal bodies is provided which permits reliable and stable measurement of changes in diameter in a simple way. Measuring signals of relatively high accuracy are formed by compensating for environmental parameters such as ambient temperature and humidity. A dynamic reference signal which depends on the environmental parameters is formed for this purpose.

16 Claims, 7 Drawing Sheets

Prior Art

CIRCUIT ARRANGEMENT FOR THE METROLOGICAL DETERMINATION OF DIAMETERS OF METAL BODIES

TECHNICAL FIELD

The present invention relates to a circuit arrangement for measuring diameters of metal bodies, in particular of wires, according to the preamble of claim 1.

BACKGROUND OF THE INVENTION

Diameters of metal bodies, in particular of wires, are determined for various purposes.

Determining the diameter of a wire is important, for example, in the production of incandescent lamps. The wires used for production of incandescent lamps must have an approximately constant diameter, otherwise there is the risk that the wires are unsuitable for further processing at the points at which the diameter is too large or too small. The wires which are used to produce incandescent lamps have a diameter in the range of typically 8–500 μm. It is impossible in practice to measure the diameter of these wires in a direct mechanical fashion, for example by means of a micrometer screw. One method of the prior art consists in weighing wire segments of defined length, for example 200 mm, in order to derive the average diameter of the wire segment from the weight (weighing method).

Since the quality of an incandescent lamp depends on its service life and the latter depends inter alia, on the uniformity of the tungsten wire used for the incandescent filament, when producing incandescent lamps it is of great importance already to establish in an early stage of the production, specifically when providing and cleaning the wire, which wire sections are unsuitable for further processing. Wire sections whose diameters are above or below a specific desired value are unsuitable.

In the prior art, an oscillator which generates a radio-frequency (RF) signal in the megahertz band has its frequency detuned by the means of a measuring capacitor (capacitor 11; in FIGS. 1a, 1b) whose capacitance varies with the diameter of the wire guided through. An output signal is formed from this detuning, and a wire diameter deviation is determined (RF micrometer) with respect to an average diameter which can be determined by means of the abovementioned weighing method. If the diameter at the start of the wire is determined using the weighing method and combined with the measured relative values, the result is a data record with absolute wire diameters.

It is thus possible to use the circuit arrangement to determine whether a specific wire segment is suitable for the production of a specific type of incandescent lamp.

The RF micrometer according to the prior art has the disadvantage that the output signal which is to represent the diameter deviation of the wire is unstable, the instability being the result of fluctuating environmental parameters (temperature, atmospheric humidity, etc.) which influence the dielectric constant of the measuring capacitor and thus the capacitance of the latter. These problems exist, in particular, at the fabrication shops for the tungsten wires, where the room temperature is influenced by a multiplicity of parameters (thermal emission of the machines, etc.) which can scarcely be mastered in practice. This severe disadvantage in the prior art is remedied by carrying out the measurement in a conditioning room screened from the environment. Aside from the fact that such a measure is very expensive in terms of energy and cost, it is impossible for this method to be used for automatically testing directly at the wire fabrication shops.

SUMMARY OF THE INVENTION

It is therefore the object of the present invention to provide a circuit arrangement for measuring diameters of the type mentioned at the beginning, which permits reliable and stable measurement of changes in diameter in a simple way.

This object is achieved by means of the characterizing features of claim 1. Particularly advantageous refinements are to be found in the dependent claims.

According to the invention, measuring signals of relatively high accuracy are formed by compensating for the environmental parameters (for example ambient temperature and/or ambient atmospheric humidity) of the measuring arrangement. The accuracy of the signals formed by the circuit arrangement according to the invention is independent, in particular, of ambient temperature and fluctuations in ambient temperature. The environmental parameters are preferably taken into account during the entire measuring period. A dynamic reference signal which depends on the environmental parameters is formed for this purpose. This measuring arrangement requires no conditioning room screened from the environment, but can be used straight away in rooms in which wires are produced or processed.

The measurement of diameter deviation is carried out in the low-frequency (LF) region from 10 kHz to 30 kHz, which means said frequency is substantially lower than the frequency used in the prior art (LF micrometer).

The combination of the reference signal and the sensor signal is preferably carried out by means of a voltmeter.

The circuit arrangement according to the invention is further distinguished by its comparatively simple design.

The capacitor which generates the sensor signal is preferably arranged in the immediate spatial proximity of the reference sensor or on a common carrier, thus ensuring that the environmental parameters prevailing at the site of the actual measurement are taken into account equally by both sensors.

In a further preferred exemplary embodiment, the reference signal is generated by a capacitor. The latter can preferably be of exactly the same design as the capacitor of the sensor device, which capacitor generates the sensor signal.

DESCRIPTION OF THE DRAWINGS

The present invention is explained below in more detail with the aid of preferred exemplary embodiments in conjunction with the figures, in which:

FIG. 3b shows a configuration of the measuring capacitor of the circuit according to FIG. 3a;

FIG. 4 shows characteristics of the first and second device as well as an output characteristic of the inventive circuit according to FIG. 3a;

FIG. 6b shows a reference signal and a sensor signal of a circuit arrangement in accordance with the present invention according to FIG. 3a;

FIG. 7b shows a configuration relating to the circuit according to FIG. 7a;

FIG. 8 shows output signals in the case of the arrangement according to FIG. 7a;

FIG. 9 shows a mechanical arrangement of the circuit according to FIG. 7a.

DESCRIPTION OF THE PREFERRED EMBODIMENTS

Figure 1A:
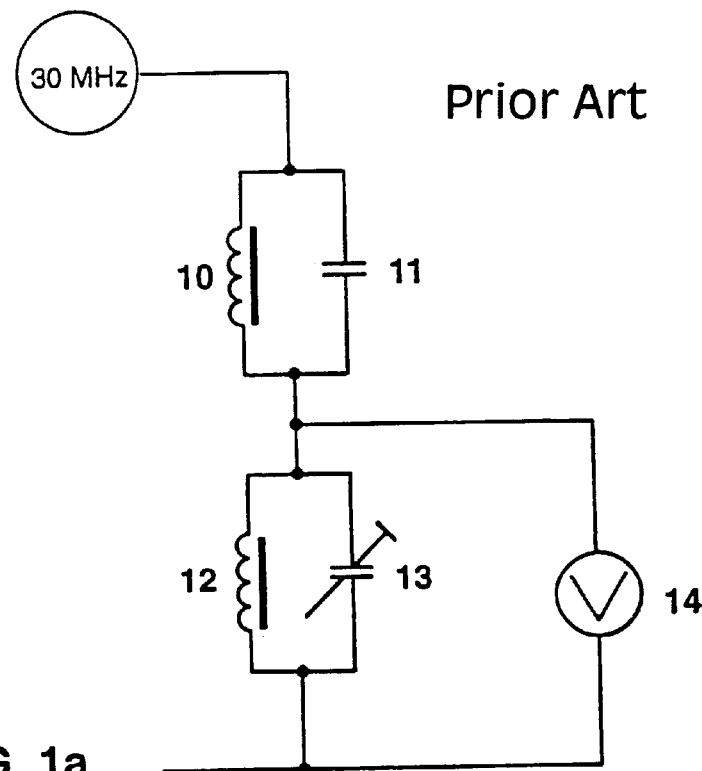
FIG. 1a shows a block diagram of a conventional measuring circuit arrangement (RF micrometer)

FIG. 1a shows a measuring circuit in accordance with a circuit arrangement of the prior art. The circuit arrangement comprises a diameter sensor which comprises a coil 10 and a capacitor 11, and a balancing device which comprises a coil 12 and a balancing capacitor 13. The circuit arrangement further has a voltmeter 14 which is connected in parallel with the balancing device.

The conventional circuit arrangement according to FIG. 1a is operated using radio-frequency signals in the megahertz region (for example 30 MHz). A wire whose deviation in diameter is to be determined is guided into the capacitor 11. At the start of measurement, the balancing capacitor 13 of the balancing device is set such that the voltmeter 14 is set to zero. The wire segment to be measured is guided over its entire length through the measuring capacitor. The capacitance of the capacitor 11 fluctuates with the fluctuations in diameter of the wire, as a result of which in cooperation with the coil 10 and the capacitor 11 the oscillator formed by these two elements has its frequency detuned. The voltmeter 14 indicates a positive or a negative voltage depending on the detuning. This voltage permits a statement to be made on the relative fluctuation in the diameter of that point of the wire which is currently in the capacitor 11.

Figure 1B:
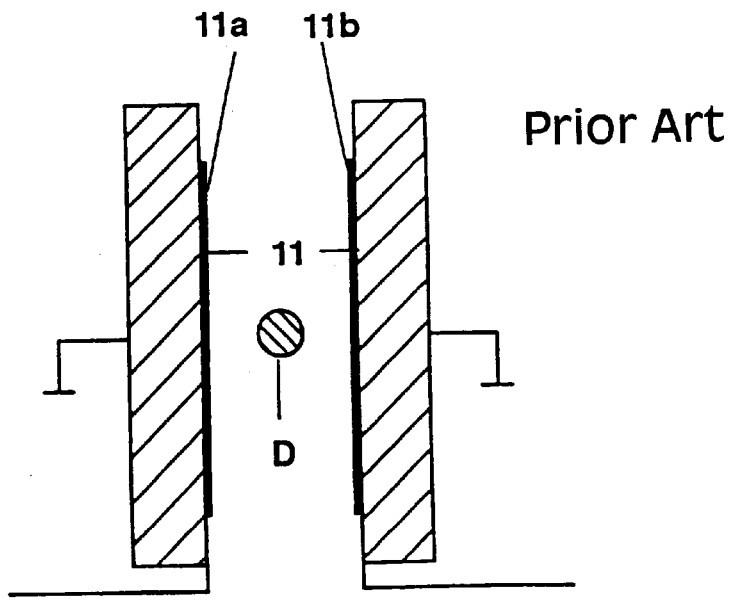
FIG. 1b shows a configuration of the measuring capacitor with inserted wire, in accordance with the prior art.

FIG. 1b shows the measuring capacitor with the two plates 11a and 11b and the wire D to be measured, which is located between the two capacitor plates.

Figure 2:
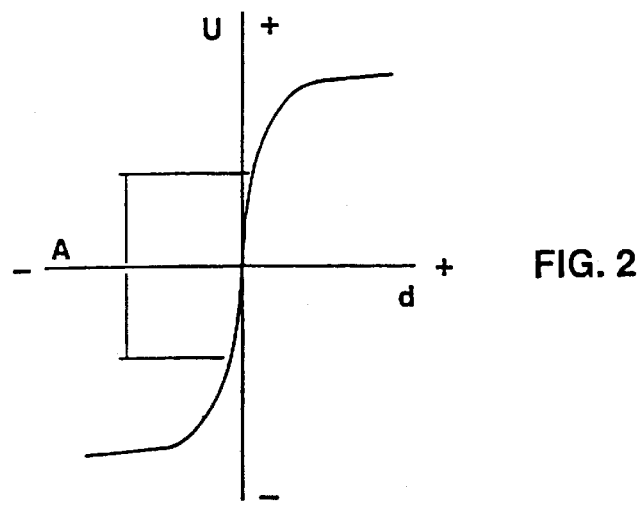
FIG. 2 shows the characteristic of the output signal of the measuring circuit according to FIG. 1.

FIG. 2 shows a characteristic of the circuit arrangement according to FIG. 1a. Said characteristic graph shows the dependence of the change in voltage U (at 14 in FIG. 1a), plotted on the ordinate, on the change in the wire diameter d, which is plotted on the abscissa. In practice, this circuit arrangement permits the diameter to be determined in the operating region A, since it is only there that the characteristic of said circuit arrangement is linear and therefore can be evaluated in a simple way.

Figure 3A:
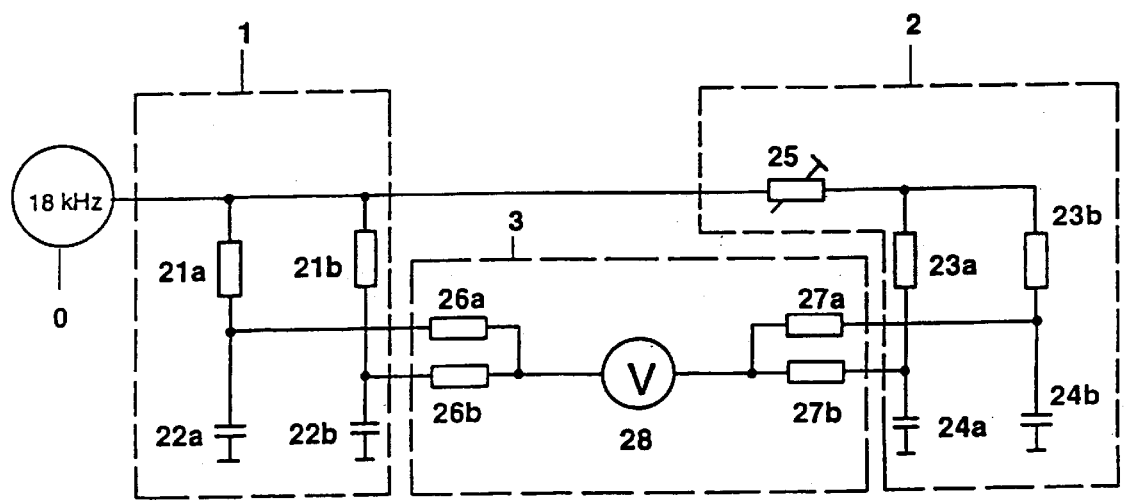
FIG. 3a shows a circuit arrangement in accordance with the present invention (LF micrometer)

FIG. 3a shows the block diagram of a measuring bridge in accordance with the present invention. The measuring bridge serves, in particular, to measure diameters of wires which are intended for the production of incandescent lamps, and comprises a sensor unit 1 ("first device"), a reference unit 2 ("second device") and a measuring unit 3 ("third device"), which combines the sensor signals and the reference signals with one another. The first device 1 has two resistors 21a, 21b and a measuring capacitor 22 (FIG. 3b), which forms two capacitors 22a, 22b together with the wire D to be measured. The wire D is grounded. The second unit 2 has two parallel RC branches (23a, 24a; 23b, 24b) and a balancing potentiometer 25. The third device 3 is, in particular, configured in such a way that it compares the impedances of the measuring branches and the reference branches. The resistors 26a, 26b of the third device 3 are arranged in such a way that the sum of the potentials of the midpoints of the two measuring branches is present at the display instrument 28. The sum of the potentials is fed in a corresponding way from the reference device via the resistors 27a, 27b. The display instrument 28 is configured here as a voltmeter. The circuit is excited by a low-frequency oscillator O.

Figure 3B:
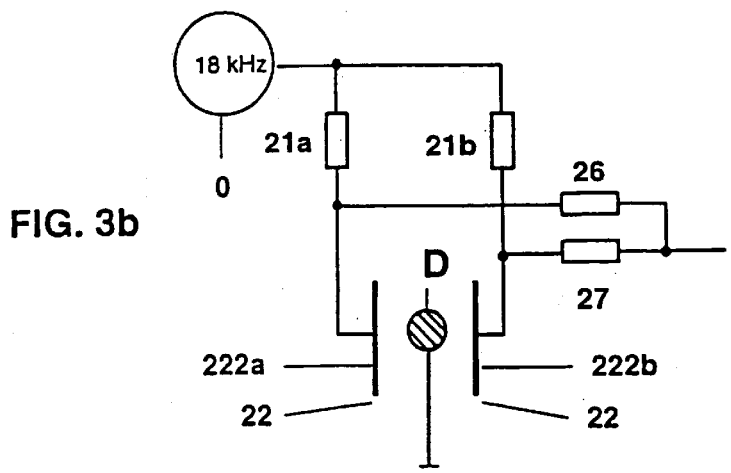

FIG. 3b shows a configuration of the arrangement according to the invention. Together with the capacitor plates 222a, 222b, the grounded wire D forms two capacitors 22a and 22b (compare FIG. 3a).

Figure 3C:
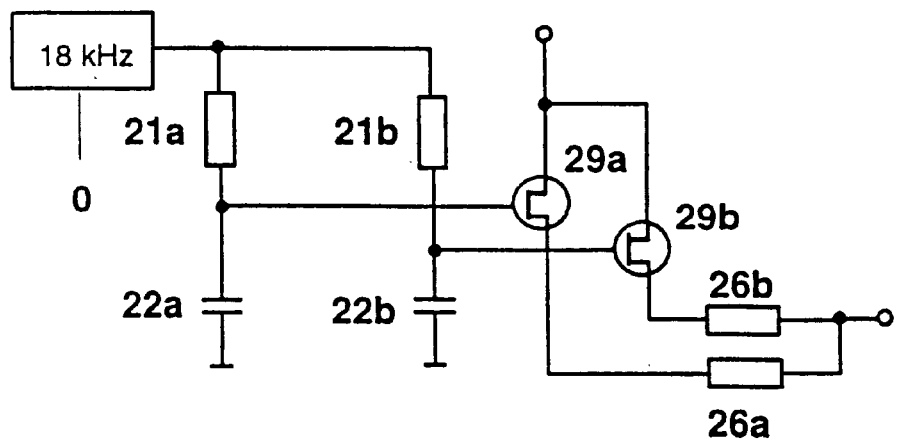
FIG. 3c shows an electric block diagram with signal summation by means of field-effect transistors.

As a further embodiment of the circuit arrangement according to the invention, FIG. 3c shows an arrangement of two field-effect transistors (29a, 29b) as impedance transformer for low-resistance generation of the output signal of the measuring device. The output signal of the reference unit can be transformed in a corresponding way.

When selecting a suitable field-effect transistor, the aim is a high input impedance and low parasitic capacitances.

The measuring principle of the circuit arrangement in accordance with FIG. 3a is based on the fact that the first device measures the low-frequency (LF) impedances of the capacitor-wire configuration and generates signals which are inversely proportional to the capacitors 22a, 22b formed by the wire D and measuring capacitor 22. At the same time as the deviation in diameter d of the wire D is detected, in this arrangement according to the invention the second device detects environmental parameters (for example temperature, atmospheric humidity) and forms reference signals dependent thereon. The first device 1 and the second device 2 are configured such that and arranged relative to one another such that they are essentially exposed to the same ambient temperature and/or the same ambient atmospheric humidity.

The wire whose deviation in diameter is to be determined is inserted into the interspace between the two capacitor plates 222a, 222b. The sensor device 1 generates a sensor signal which is representative of the capacitances of the wire/capacitor system and is, furthermore, influenced by the said environmental parameters. The reference device 2 generates a reference signal which is influenced by the same environmental parameters. The comparator device 3 combines the reference signal generated by the reference device 2 with the sensor signal generated by the sensor device 1 and forms an output signal, for example a voltage, the influence of ambient temperature and/or ambient atmospheric humidity on the measuring device 1 being compensated for. The measurement can thereby be carried out in any surroundings without a reduction in the accuracy of measurement. Keeping specific environmental parameters constant, for example in a conditioning room, is thus not required for a correct measurement result.

Figure 4:
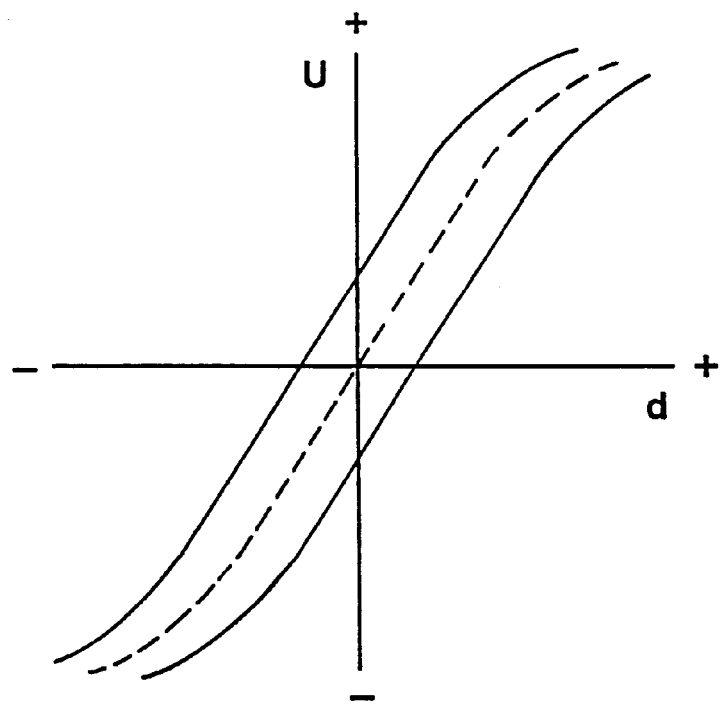

FIG. 4 serves to explain the compensation principle according to the invention. The continuous curves show the change in the output signal of the first device 1 and of the second device 2 as a function of the fluctuation in one of the parameters of temperature or atmospheric humidity. Since both devices 1, 2 can be designed and realized in such a way that their characteristics have the same gradient, that is to say react in the same way to fluctuations in parameters, it is possible to compensate for the influence of the fluctuations in parameters on the measuring device 3 by forming the difference between the signals of the two devices (if appropriate, after zero offsetting of the two curves by balancing, compare the dashed characteristic). This could not be realized with an arrangement according to the prior art (RF micrometer), since it is scarcely possible in practice to realise two oscillators having an adequately similar characteristic gradient.

Figure 5A:
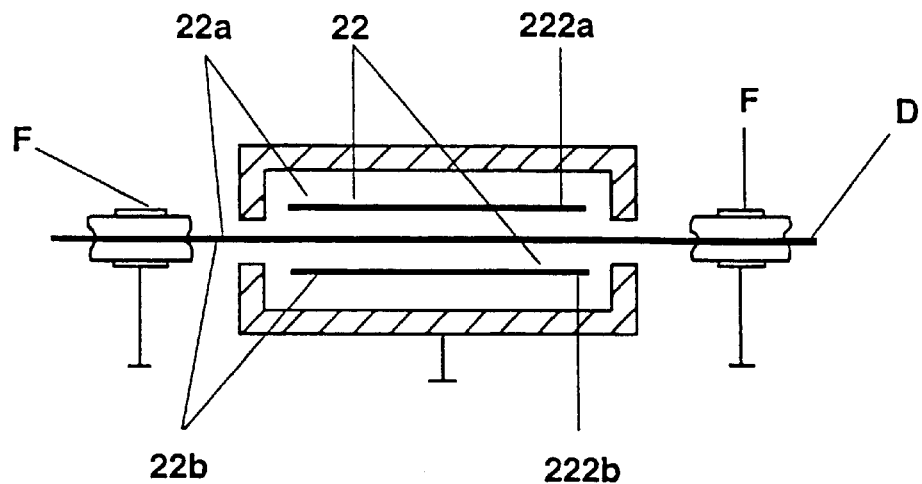
FIG. 5a shows a mechanical embodiment of a capacitor and of a wire guidance of the measuring device according to the invention.

FIG. 5a shows the measuring capacitor 22 which has already been described with the aid of FIGS. 3b, 3c and into which the wire D whose diameter is to be measured is inserted. In this case, the wire is to be inserted into the capacitor 22 in such a way that it has in each case approximately the same spacing relative to the capacitor plates 222a and 222b. For this purpose, the wire D is advantageously guided over rollers F which have a groove running around the circumference. Said rollers serve additionally to ground the wire. Typical edge lengths for the capacitor plates 222a, 222b are 8 mm times 14 mm, and the plate spacing is typically 1 mm. The plate spacing can be varied in order to measure wires of different thickness.

The resulting output signal is not absolutely determined in the case of this measuring method either. Instead, the output signal is balanced to zero by setting the potentiometer 25 at the start of a measuring operation with a wire introduced into the measuring device 1. After this setting operation, the output signal (at 28 in FIG. 3a) is formed as a function of the reference signals (generated by the second device 2), which are produced, in turn, as a function of the respectively prevailing environmental parameters. Continuously updated reference signals (compare FIG. 6b) are formed in the circuit arrangement according to the invention. The output signal is generated by means of the comparator device 28 from the combination of the sensor signal and the reference signal. Changes in the wire diameter cause a positive or a negative signal, as is represented, for example, in FIG. 6b.

The deviation of the wire diameter referred to the initial value can be determined for each point along the wire by guiding the wire over its entire length through the capacitor 22.

Figure 5B:
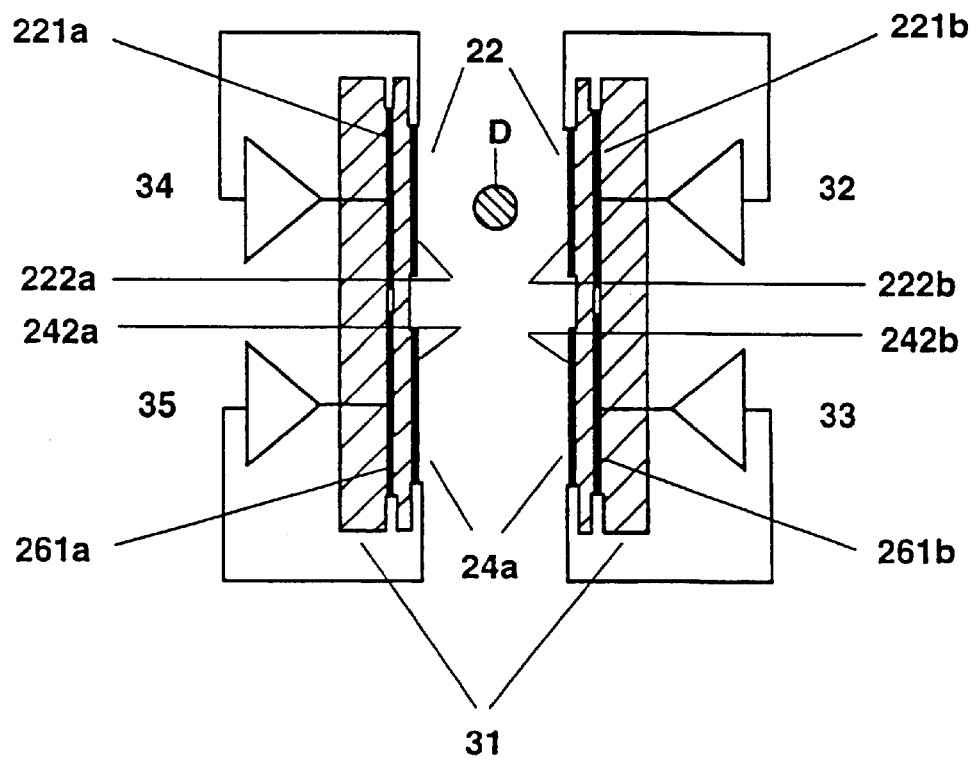
FIG. 5b shows a mechanical embodiment of the measuring device according to the invention, with active screening.

FIG. 5b shows a preferred embodiment for the arrangement of the measuring capacitor 22 and a capacitor 24a of the second device 2 with active screening. In this preferred arrangement, the capacitor 22 is located in direct spatial proximity to the capacitor 24a. The capacitors 22, 24a have the capacitor plates 222a, 222b and 242a, 242b, respectively. In the case of the arrangement represented in FIG. 5b, the capacitor plates 222a and 222b are fitted on a holding device 31 directly above the capacitor plates 242a and 242b of the capacitor 24a. The holding device 31 comprises two parts (left and right in the figure), each part comprising, for example, two plates (hatched obliquely). The metal plates 221a, 221b, 261a, 261b are arranged parallel to the capacitor plates and form an active screen by using the impedance transformer 32–35 to set the capacitor plates and the screening plates to the same potential in each case. The effect of said screening arrangement is that the capacitances of the two capacitors 22 and 24a are independent of external electromagnetic interference effects. The wire D is also grounded here via guide rollers (not represented in the figure).

Signals which represent the diameter of an identical wire segment are plotted against wire length in FIG. 6. A wire having relatively large fluctuations in diameter was used as the wire segment.

Figure 6A:
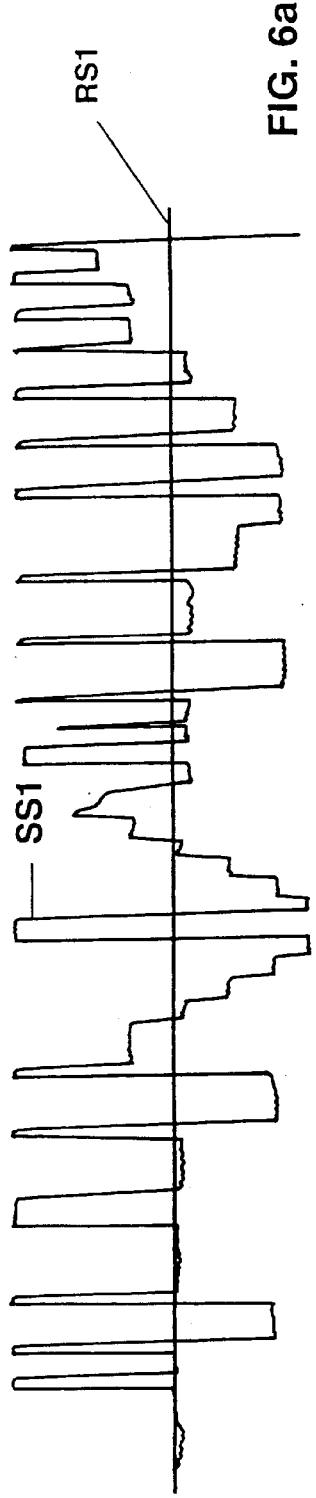
FIG. 6a shows a signal of a wire with fluctuations in diameter, which is generated by a conventional circuit arrangement according to FIG. 1.

FIG. 6a shows the signal of a wire having fluctuations in diameter which is recorded using a conventional circuit arrangement. In the prior art, balancing to zero is performed only at the start of the measurement. This balancing value RS1 is preserved for the entire course of the measurement. The signal SS1 denotes the relative fluctuations in diameter over the wire length.

Figure 6B:
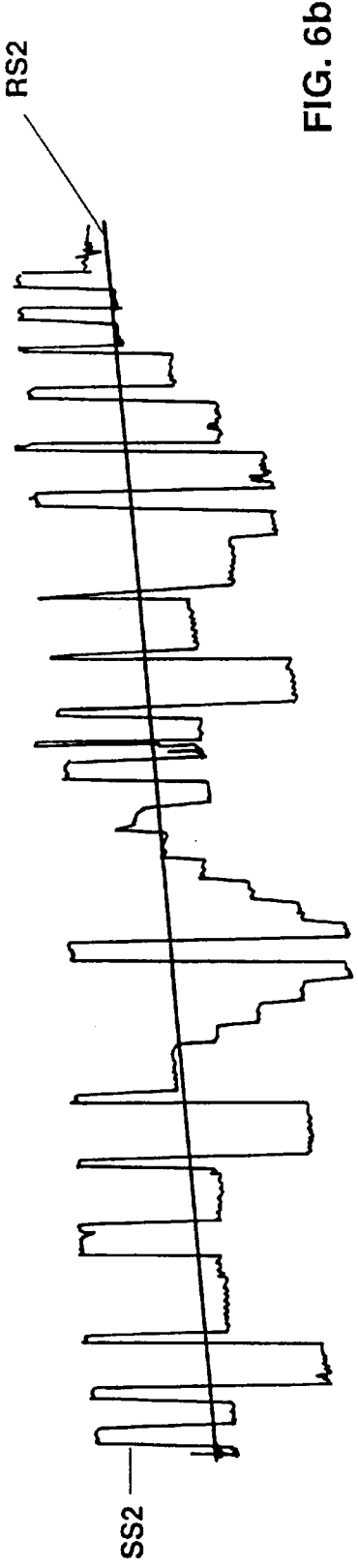

FIG. 6b shows the measurement by means of a circuit arrangement in accordance with the present invention. Both a reference signal RS2 and a sensor signal SS2 are shown in this figure. The change in the environmental parameters also effects a change in the reference signal RS2 in the example represented.

Figure 6C:
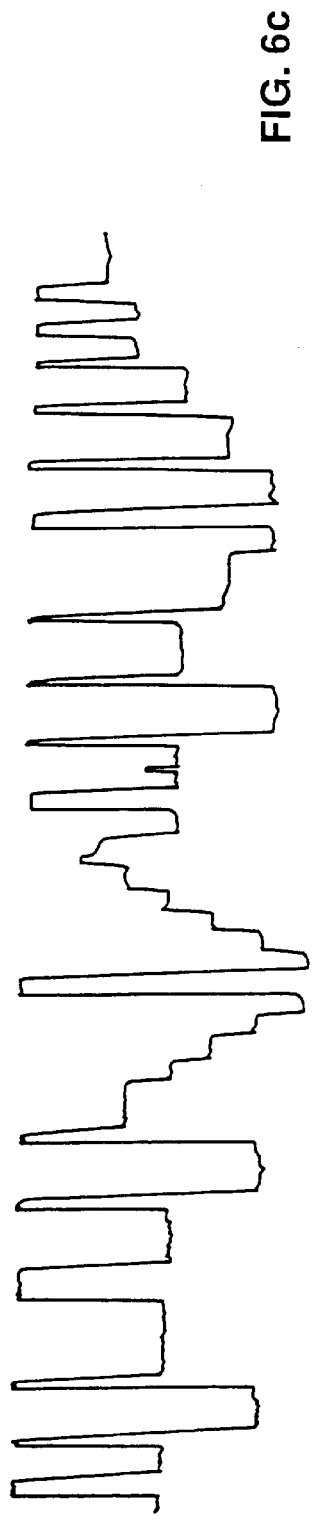
FIG. 6c shows an output signal which is formed by combining the reference signal with the sensor signal according to FIG. 6b.

FIG. 6c shows the output signal generated by the comparator device 3 (FIG. 3a), which is generated by subtracting the reference signal RS2 from the sensor signal SS2, in order to compensate for the influence as a result of fluctuation in the environmental parameters during the measuring operation.

Whereas FIG. 6a represents the values of a measuring operation which is limited to a relatively short time (for example 5 minutes) and is carried out in a conditioning room with environmental parameters held constant (temperature, atmospheric humidity), FIGS. 6b and 6c represent values of a measuring operation which can extend over a relatively long time (for example 2 hours) and takes place under normal production conditions.

Figure 7A:
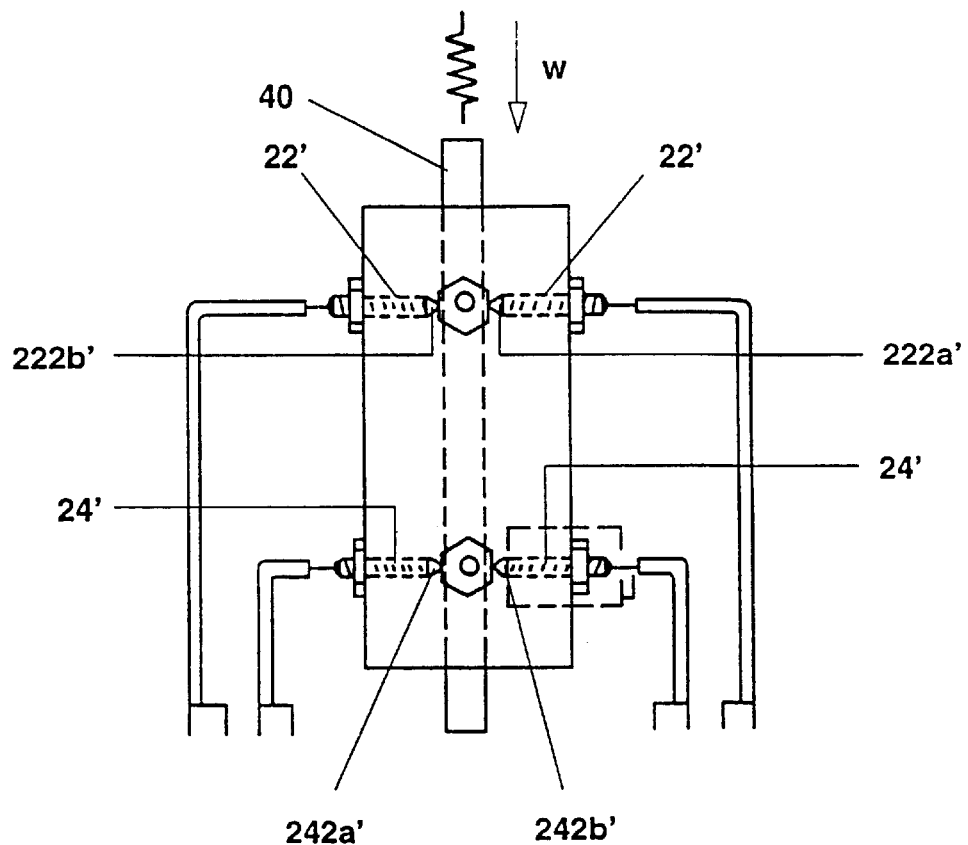
FIG. 7a shows an arrangement for determining lead errors in filaments in accordance with the invention.
Figure 7B:
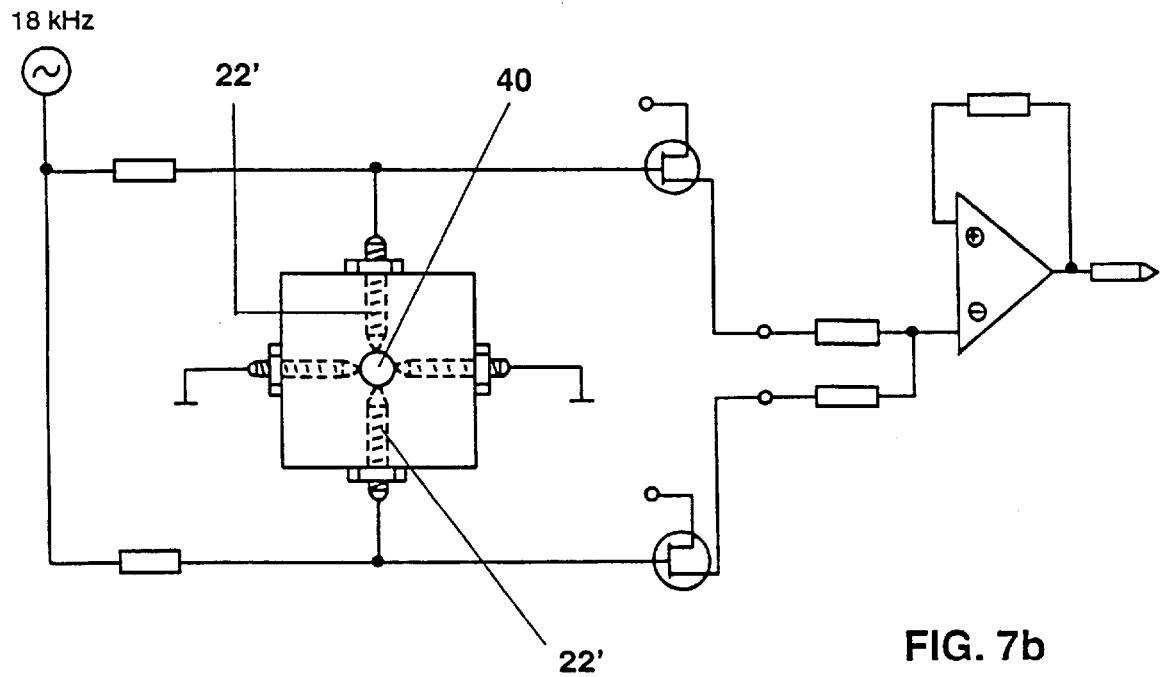

The circuit according to the invention can advantageously also be modified for investigating incandescent lamp filaments. FIG. 7 shows an arrangement for detecting lead errors of incandescent lamp filaments and/or lengths of incandescent lamp filaments. A filament w is preferably inserted vertically into the arrangement. FIG. 7a shows a side view of the arrangement, and FIG. 7b a plan view of the arrangement. The arrangement has a ceramic tube 40 which is surrounded by a capacitor arrangement (22', 24'). Said capacitor arrangement corresponds diagrammatically to the arrangement represented in FIG. 3a. However, the two devices 1, 2 are constructed here as sensors. In order to achieve a particularly high spatial resolution, said capacitor arrangement is configured mechanically in such a way that the capacitor electrodes 222a', 222b', 242a', 242b' are constructed in the shape of needles, for example, as screws. Here, the two sensor signals are used to determine the lead errors of the filament. The corresponding signal characteristic for passage of the filament in the region of the first and second capacitors in the vertical direction is represented in FIG. 8. The filament lead ws can be inferred from the periodicity of the signal. The measurement in the second device 2 serves, on the one hand, to increase the accuracy, while it is possible, on the other hand, to determine from this the speed v of the filament passing through, and this permits the length l of the filaments to be determined. Balancing to zero of the measuring device can be carried out automatically in this device in the period between the through passage of two filaments.

Figure 7C:
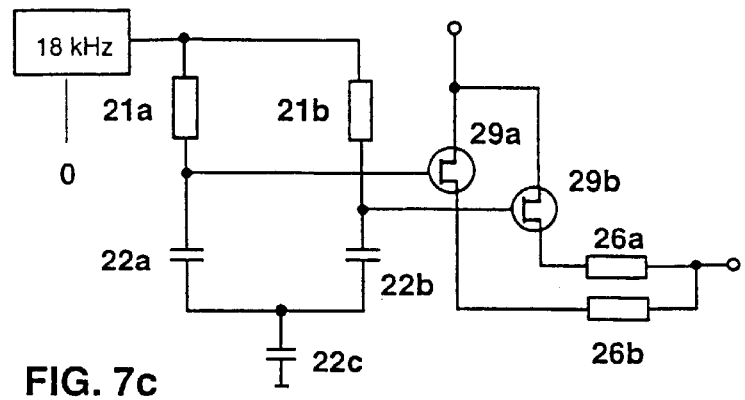
FIG. 7c shows an electric block diagram of the circuit according to FIG. 7a with signal summation by means of field-effect transistors.
Figure 8:
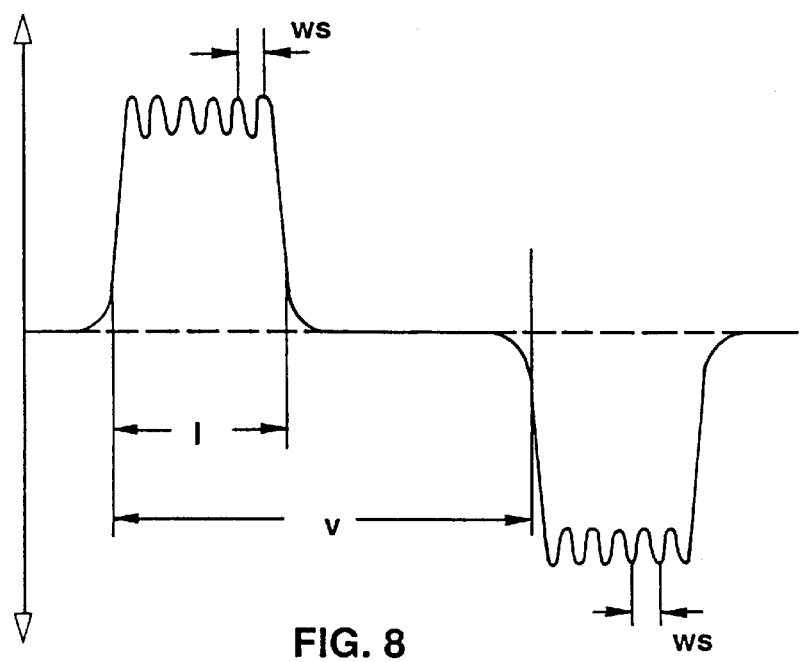

FIG. 7c corresponds to FIG. 3c, the filament w (FIG. 7a) forming an additional capacitor 22c with respect to frame, however, during passage through the measuring device, since the filament is not connected to frame.

Figure 9:
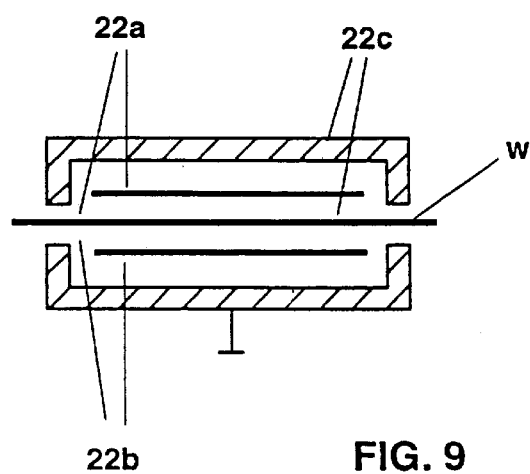

FIG. 9 shows the measuring capacitor in the case of the use of the sensor device to determine lead errors in filaments. Since the filaments are not grounded, the wire forms a third capacitor 22c with the sensor housing. This capacitor arrangement as well can be completed by active screening.

What is claimed is:

1. A circuit arrangement for measuring diameters of metal bodies, in particular of wires, having a first device (1) which generates a sensor signal, and an oscillator (O) which feeds electric signals of a prescribable frequency to the first device (1), wherein the circuit arrangement has a second device (2), which generates a reference signal as a function of the ambient temperature and the ambient atmospheric humidity, and has a third device (3) which combines the sensor signal with the reference signal and generates an output signal which represents a change in the diameter of the metal body, and wherein the first device (1) and the second device (2) are arranged in such a way relative to one another that both devices are exposed to the same ambient temperature and the same ambient atmospheric humidity, with the result that the influence of ambient temperature and the ambient atmospheric humidity is compensated for when forming the output signal.

2. The circuit arrangement as claimed in claim 1, wherein the reference signal is generated at different instants during the measurement of the changes in diameter.

3. The circuit arrangement as claimed in claim 1 wherein the oscillator (O) feeds the first and the second device (1, 2) electric signals in the frequency band from approximately 10 kHz to 30 kHz.

4. The circuit arrangement as claimed in claim 1, wherein the third device (3) contains a voltmeter.

5. Use of a circuit arrangement as claimed in claim 1 for detecting lead errors in incandescent lamp filaments and lengths of incandescent lamp filaments.

6. An arrangement of claim 1 with a capacitor (22), which first device (1) is suitable for generating a sensor signal in operation, and of a second device (2) with a sensor (24a, 24b) which second device (2) is suitable for generating a reference signal in operation, in such a way that the two devices are exposed to the same ambient temperature and the same ambient atmospheric humidity, with the result that it is possible, if appropriate, when forming an output signal from the sensor signal and reference signal to compensate for the influence of ambient temperature and the ambient atmospheric humidity, the capacitor (22) and sensor (24a, 24b) having plates (222a, 222b) in each case have an area of approximately 8 mm×14 mm and have a spacing of at least 1 mm.

7. The circuit arrangement as claimed in claim 1, wherein the first device (1) comprises at least one capacitor (22) into which the metal body whose diameter is to be measured can be inserted.

8. The circuit arrangement as claimed in claim 7, wherein the capacitor (22) is a plate capacitor whose plates (222a, 222b) in each case have an area of approximately 8 mm×14 mm and have a spacing of at least 1 mm.

9. The circuit arrangement as claimed in claim 8, wherein the plate capacitor is configured mechanically in such a way that the spacing of the plates is variable.

10. The circuit arrangement as claimed in claim 8, wherein the plates are formed from copper laminate.

11. The circuit arrangement as claimed in claim 10, wherein the copper laminate is silvered.

12. The circuit arrangement as claimed in claim 7, wherein the capacitor (22) is arranged in direct spatial proximity to a sensor (24a, 24b) of the second device (23a, 23b, 24a, 24b).

13. The circuit arrangement as claimed in claim 12, wherein the capacitor (22) and the sensor (24a, 24b) are arranged on a common carrier (31).

14. The circuit arrangement as claimed in claim 12, wherein further plates, whose potential is equal to the potential of the capacitor plates, are arranged parallel to the plates of the capacitor (22) on the outside of the capacitor.

15. The circuit arrangement as claimed in claim 12, wherein the sensor (24a, 24b) is a capacitor.

16. The circuit arrangement as claimed in claim 15, wherein the capacitor (24a, 24b) of the sensor is of identical design to the capacitor (22) of the first device (1).

* * * * *